(12) United States Patent
Williams et al.

(10) Patent No.: US 8,370,263 B2
(45) Date of Patent: Feb. 5, 2013

(54) PROVIDING TRUSTED SERVICES MANAGEMENT USING A HYBRID SERVICE MODEL

(75) Inventors: Geoffrey R. Williams, Midlothian, TX (US); James E. Burgess, Charlotte, NC (US); Alicia C. Jones, Fort Mill, SC (US); Mark D. Zanzot, Huntersville, SC (US)

(73) Assignee: Bank of America Corporation, Charlotte, NC (US)

( * ) Notice: Subject to any disclaimer, the term of this patent is extended or adjusted under 35 U.S.C. 154(b) by 33 days.

(21) Appl. No.: 13/173,551

(22) Filed: Jun. 30, 2011

(65) Prior Publication Data

US 2012/0255028 A1    Oct. 4, 2012

Related U.S. Application Data

(60) Provisional application No. 61/469,901, filed on Mar. 31, 2011.

(51) Int. Cl.
*G06Q 20/00* (2012.01)
*G06Q 30/00* (2012.01)
*G06Q 40/00* (2012.01)

(52) U.S. Cl. ............... 705/64; 705/39; 705/41; 705/65

(58) Field of Classification Search ............ 705/39, 705/41, 64, 65
See application file for complete search history.

(56) References Cited

U.S. PATENT DOCUMENTS

8,108,318 B2 * 1/2012 Mardikar .............. 705/65
2009/0307142 A1 * 12/2009 Mardikar .............. 705/72

FOREIGN PATENT DOCUMENTS

WO   WO2010/138611 A1 * 12/2010

OTHER PUBLICATIONS

Akram et al. ("Application Management Framework in User Centric Smart Card Ownership Model", WISA 2009, LNCS 5932, pp. 20-35, 2009, © Springer-Verlag Berlin Heidelberg 2009).*

* cited by examiner

*Primary Examiner* — James D Nigh
(74) *Attorney, Agent, or Firm* — Banner & Witcoff, Ltd; Michael A. Springs

(57) ABSTRACT

Methods, computer readable media, and apparatuses for providing trusted services management using a hybrid service model are presented. According to one or more aspects, a first transaction log of a first secure element included in a mobile computing device may be received. The first secure element may be provisioned with first secure information provided to a user of the computing device by a first entity, such as a first financial institution. Subsequently, a second transaction log of a second secure element included in the mobile computing device may be received. The second secure element may be provisioned with second secure information provided to the user of the computing device by a second entity different from the first entity, such as a second financial institution, for instance. In some arrangements, incentive offers may thereafter be provided to the user based on the first transaction log and the second transaction log.

17 Claims, 8 Drawing Sheets

PROVIDING TRUSTED SERVICES MANAGEMENT USING A HYBRID SERVICE MODEL

CROSS-REFERENCE TO RELATED APPLICATIONS

This application claims the benefit of U.S. Provisional Patent Application Ser. No. 61/469,901, which was filed Mar. 31, 2011, and entitled "Trusted Services Management," and which is incorporated by reference herein in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution, or other entity in providing trusted services management using a hybrid service model.

BACKGROUND

Trusted Services Management (TSM) is a set of technologies that supports activities generally related to transferring information that might typically be stored in a person's physical wallet, such as the person's credit card numbers, debit card numbers, driver's license information, and so on, to a secure element on a mobile computing device, such as a MicroSD card or a Near Field Communications (NFC) sticker associated with a smartphone. Currently, some TSM services are offered to organizations, such as financial institutions, as hosted services managed by third party vendors. In dealing with third party vendors, however, organizations, such as financial institutions, may have to take additional measures to implement TSM services, which may increase the cost and complexity associated with providing such services, while decreasing revenue and information security.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to providing trusted services management using a hybrid service model. In particular, some aspects of TSM services may be self-managed by an organization, such as a financial institution, and directly provided to customers of the organization by the organization itself, while other TSM services (which may be different from and/or the same as the TSM services that are self-managed by the organization) may be managed by a third party vendor and provided to the same customers by the third party vendor in conjunction with the organization's provision of similar services. This implementation model may create unique business opportunities for an organization, such as a financial institution, that implements TSM using such an implementation model.

According to one or more aspects, a first transaction log of a first secure element included in a mobile computing device may be received. The first secure element may be provisioned with first secure information provided to a user of the mobile computing device by a first entity, such as a first financial institution. For example, the first secure element may be a MicroSD card on which the user has securely stored an account number of a credit card issued to the user by the first financial institution. Subsequently, a second transaction log of a second secure element included in the mobile computing device may be received. The second secure element may be provisioned with second secure information provided to the user of the mobile computing device by a second entity different from the first entity, such as a second financial institution, for instance. In some arrangements, where each of the secure elements is provisioned with credit card information corresponding to credit cards issued by different financial institutions, the user of the mobile computing device may be provided with an incentive offer to use a first credit card (associated, for instance, with a first financial institution) more than a second credit card (associated, for instance, with a second financial institution) in response to determining, based on the first transaction log and the second transaction log, that the user is using the second credit card more than the first credit card.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

I. Trusted Services Management

A Trusted Services Manager (TSM) is conventionally a trusted third party acting as a liaison between a customer and one or more service providers to provision and personalize portable secure element devices. Functions of a TSM may include, but are not limited to, the following:

a. Information Technology Management
b. Mobile Device Network Management
c. Service Provider and Application Management
d. Over the Air (OTA) Provisioning and Management TSM provisioning of secure elements in client mobile devices may be generally best managed by vendors on behalf of service providers. However there are options for service providers to manage their own TSM service models. As OTA ecosystems mature within the United States, a model of dis-intermediated services is coming into existence, ultimately creating complexity and impeding adoption and use of secure element solutions.

Accordingly, a TSM solution is proposed that may offer customers the ability to provision portable devices containing secure elements issued by one or more service providers, while managing both security and authentication routines. While a service provider (e.g., a bank or other financial institution, or a multimedia provider or other information provider or distributor) could either exclusively manage TSM services in-house or contract a third-party TSM vendor, establishing a hybrid approach (i.e., utilizing a combination of in-house TSM and third-party contracted TSM) may position the service provider to capitalize on its customer base, service capabilities, infrastructure and security while ultimately creating an optimized service model founded upon principles of simplification and modernization.

A hybrid state TSM service model is proposed that may optimize the way in which secure elements in client mobile devices are provisioned for the service provider's customers and partners alike. Examples of client mobile devices include, but are not limited to, a smart cellular phone, an electronic wallet device, a personal digital assistant (PDA), a laptop computer, a tablet computer, a smart card, and an electronic passport device. Such a hybrid TSM service model may reduce complexity associated with maintaining industry service relationships and on-boarding of new customers, while potentially positioning the service provider to create new and unique revenue streams resulting from a combination of in-house and contracted TSM services.

Figure 1:
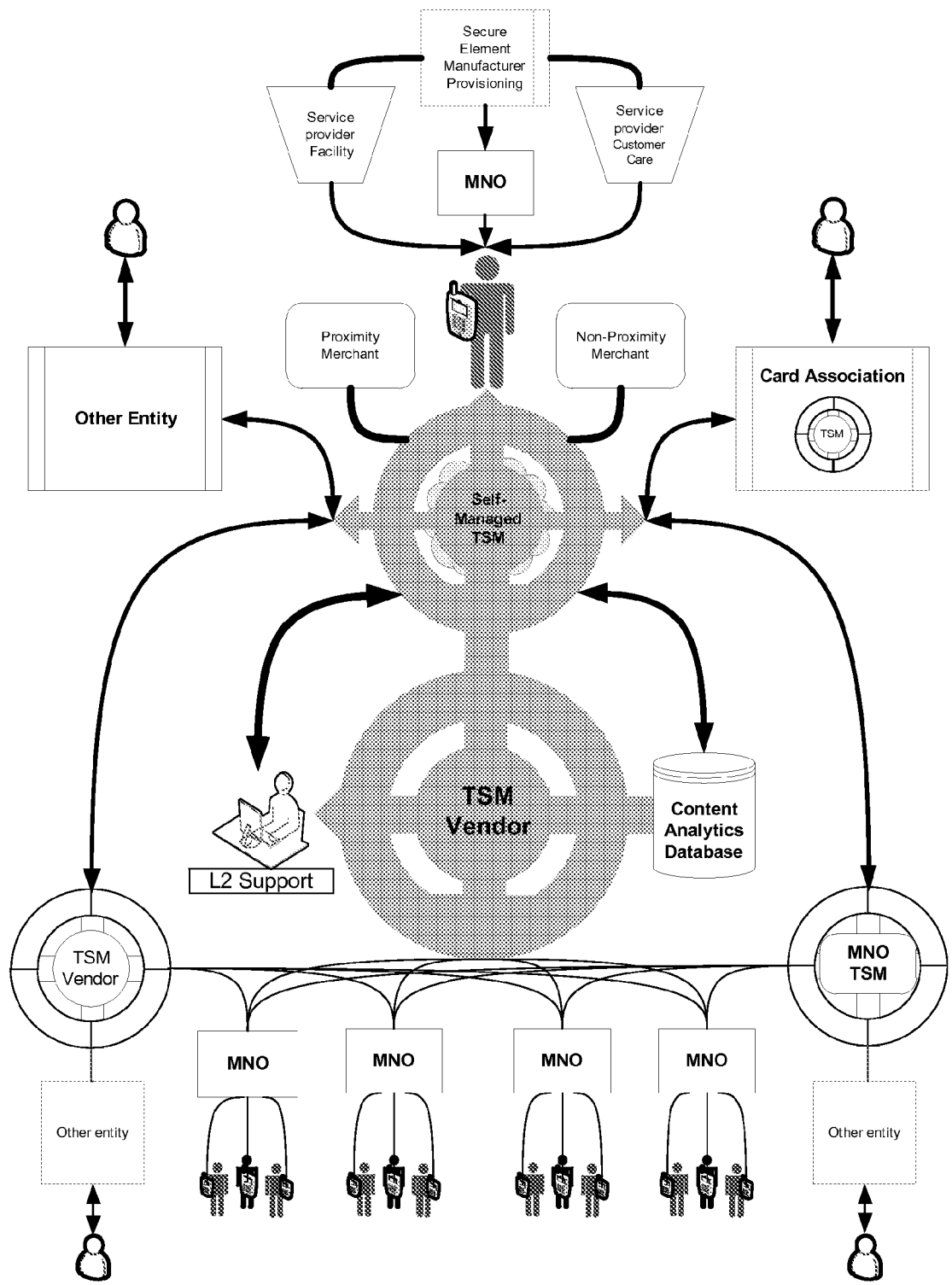
FIG. 1 illustrates an example environment in which trusted services management may be provided using a hybrid service model according to one or more illustrative aspects described herein.

FIG. 1 illustrates an example environment utilizing a hybrid model of in-house (self-managed by the service provider) and third-party TSM services. TSM services may be, for example, implemented using a licensed product of the service provider itself and/or via a secure connection to the service provider's third party hosted environment as a value added network (VAN) solution. Potential benefits of managing a third party solution within the service provider's firewalls while actively transacting with the same third party service provider may include, but are not limited to, the following:

a. Thin-client updates to licensed software may be enhanced.
b. The service provider may be positioned to "bypass" third party vendor services by establishing and maintaining more profitable "direct-connect" industry relationships, thereby increasing the amount of fee based revenue collected directly by the service provider.
c. A licensing agreement may provide for third party services that are either cost prohibitive or too complex for the service provider to maintain.
d. Customers may be provided with intentionally unrestricted provisioning access to all varieties of secure element devices.
e. Content analytics may be able to occur within a shared transactional database while prohibiting unauthorized third-party access to secure customer information.
f. Established vendor support services may be licensed to fulfill various additional customer support needs.
g. TSM software may be a replica of the vendor hosted software, and which may include but not limited to the following features and functionality:
  i. Mobile network operator (MNO)/Service Provider Relationship Management,
  ii. Security and Authentication,
  iii. Over the Air provisioning and personalization, and
  iv. Billing and Reporting.
h. Managed TSM solutions may operate within a cloud based environment to provide for stability, scalability and redundancy.
i. Managed TSM services may be leveraged to provide higher security standards for customers, ultimately potentially providing greater protection than competitors.
j. Secure connections may be established between the service provider side and vendor solution environments.
k. The target environment may also be achieved without secure connection to third-party VAN services, however the value proposition may change due to increased costs associated with establishing and maintaining a high volume of industry relationships used to provision various types of secure elements.

Referring to the top portion of FIG. 1, a secure element manufacturer may provide secure elements, such as a secure SIM card, MicroSD, and/or near-field communication (NFC) stickers, that may be pre-provisioned on behalf of issuers and integrated into client mobile devices being offered within the marketplace by MNOs or other vendors. Additionally or alternatively, secure elements may be made available to vendors, who in turn may provide the secure elements to customers (e.g., via a facility of the service provider and/or mailed from a customer care center) who wish to modify their existing client mobile devices to utilize unique services offered by the issuer via their secure element of choice.

As also shown in FIG. 1, a content analytics database may represent a shared repository that houses transactional data taking place in both the self-managed TSM and the TSM vendor(s). Database analytics may be applied to support, for instance, in-house-managed loyalty and coupon services that directly benefit customers. Customer loyalty and coupon services might introduce new revenue streams for the service provider as both proximity and non-proximity merchants subscribe to leverage the managed TSM for provisioning and personalization capabilities. Given the potential sheer volume of customers, the loyalty and coupon based services may be inherently attractive to the retail community.

As further shown in FIG. 1, a card association relationship (e.g., with one or more credit card service providers) may be managed directly through the in-house portion of the hybrid TSM service rather than contracting through a third-party TSM, if so desired. A direct mobile commerce card association relationship may improve service efficiency, reduce provisioning cycle times and reduce fee based services by eliminating the "middle man"—the intermediary TSM provider.

Maintaining relationships with MNO providers can be costly and complex. Thus, it may be desirable that the hybrid TSM service model leverage a third-party VAN TSM provider as a path to the various MNOs offering secure element products. Inversely, this relationship may also provide a way for non-customers to interact with the TSM model for desired services including, but not limited to, mobile applications and non-technology solutions or services. VAN TSM licensing fees may be reflective of the cost to maintain such relationships, but the value proposition may be more cost effective and less complex than managing directly within the entity.

Moreover, MNO TSMs may become prevalent within the marketplace, potentially providing a motivation for the hybrid TSM model to support direct-connect relationships with a variety of TSM solutions. An optimized flow may be established directly for relationships deemed to be more profitable than routing through a third-party TSM vendor, potentially subsequently reducing transactional based fees passed along to both customers and issuers.

In addition, service provider relationships may be established, managed and maintained for certain select services, such as those that are critical to accelerate use and adoption of the service provider's TSM solution set. Again, the attractability for other entities to access the service provider's customer base may create additional revenue streams for the service provider based on unique offerings made available by those entities, while potentially increasing customer satisfaction and brand loyalty. Moreover, a hybrid TSM service model may allow for the service provider to directly manage the highest value relationships directly with some entities and customers while relying on third-party TSM servicing for other interactions.

The state model described above may not necessarily restrict customers to only issuer-based services, but may allow for unrestricted access and provisioning support for both technology based and non-technology based secure element devices. The attraction of such servicing may result in higher adoption rates, increased transactional volume, and brand perception. Accelerated learnings from early adopters may firmly position the model for continuous improvement and may ultimately lead to entity-managed TSM services having a significant industry presence, potentially resulting in increased revenue, reduced expense and/or a reduced market share for third-party solution providers. In addition, opportunities referenced in FIG. 1 could be established to support a variety of services across the mobile ecosystem, possibly ultimately providing strategic leadership in a disparate industry service model.

Figure 2:
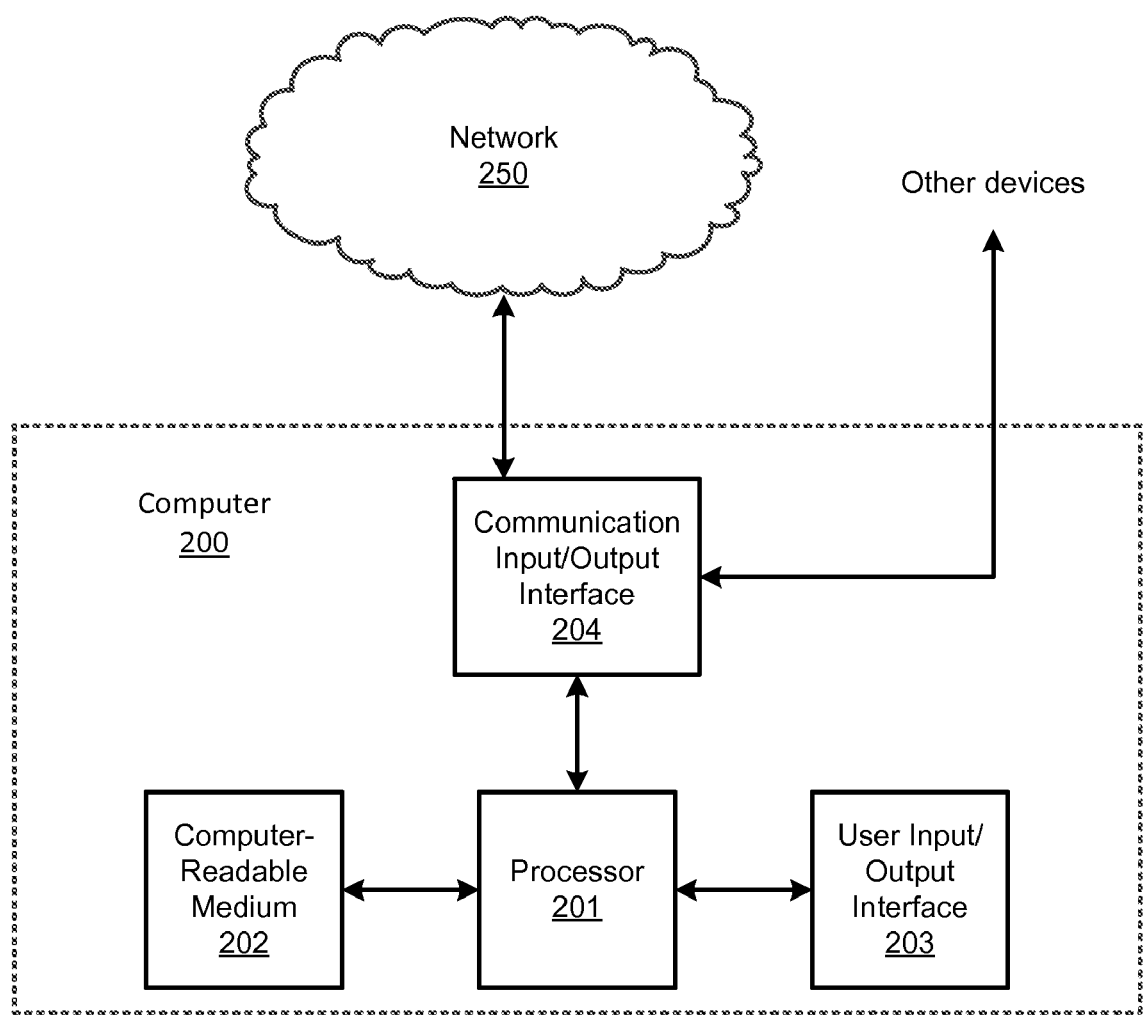
FIG. 2 illustrates an example computing device in which and/or with which various aspects of the disclosure may be implemented.

Any of the components shown in FIG. 1 may be implemented by, or otherwise include, one or more computers for performing some or all of the functions attributed to those components. An example block representation of a computer 200 is shown in FIG. 2, by which any of the components discussed herein and shown in FIG. 1 may be implemented.

Computer 200, in this example, may include hardware that may execute software and/or be configured in hardware to perform specific functions. The software may be stored on a non-transitory computer-readable medium 202 in the form of computer-readable instructions. Computer 200 may read those computer-readable instructions, and in response perform various steps as defined by those computer-readable instructions. Thus, any functions attributed to any components as described herein (e.g., client mobile devices, servers, networks, and the like) may be implemented, for example, by reading and executing such computer-readable instructions for performing those functions, and/or by any hardware subsystem (e.g., a processor 201) from which computer 200 is composed.

Computer-readable media may include not only a single non-transitory storage medium or single type of such medium, but also a combination of one or more such media and/or types of media. Examples of a computer-readable medium include, but are not limited to, one or more memories, hard drives, solid-state memory devices, optical discs (such as CDs or DVDs), magnetic discs, and magnetic tape drives.

Such a computer-readable medium 202 may store computer-readable instructions (e.g., software) and/or computer-readable data (i.e., information that may or may not be executable). In the present example, computer-readable medium 202 (such as memory and/or hard drive) may be included in any one or more of the components discussed herein, and may store computer-executable instructions and/or data used by any of those components. Alternatively or additionally, such a computer-readable medium storing the data and/or software may be physically separate from, yet accessible by, any of the devices discussed herein.

Computer 200 may also include a user input/output interface 203 for receiving input from a user (e.g., via a keyboard, mouse, and/or remote control) and providing output to the user (e.g., via a display, an audio speaker, and/or a printer). Computer 200 may further include a communication input/output interface 204 for communicating in a wireless and/or non-wireless manner with other computers or other types of devices, such as via a network 250 or via a direct wired or wireless connection.

Figure 3:
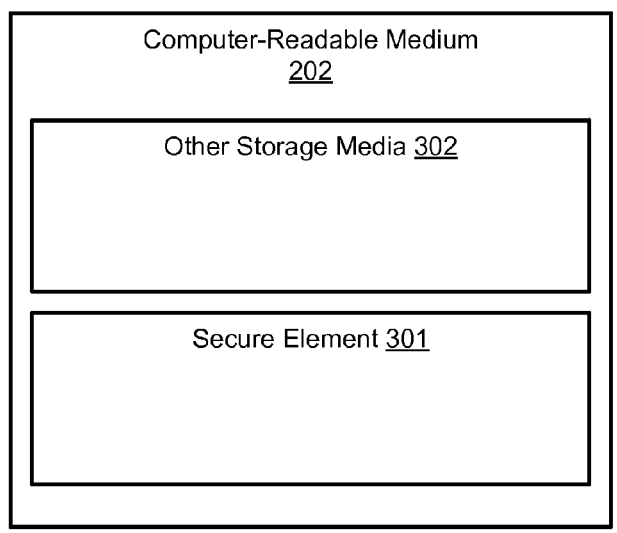
FIG. 3 illustrates an example computer-readable medium in which and/or with which various aspects of the disclosure may be implemented.

FIG. 3 is an example block representation of computer-readable medium 202 as may be implemented in one or more of the client mobile devices of FIG. 1. In this example, computer-readable medium 202 may include a secure element 301 and/or one or more other storage media, such as one or more memory chips. Computer-readable medium 202 may be physically embodied by a single physical storage medium or by multiple different physical storage media. Examples of secure element 301 include a Secure SIM, a MicroSD, an embedded storage element, and/or an NFC sticker attached to the client mobile device.

Secure element 301 may be secured by one or more domain keys in a known manner. A domain key may be a key that is needed to read and/or write information (e.g., data and/or computer-executable commands) from/to secure element 301, and/or to interpret information stored on secure element 301. Where the information is encrypted, the domain key may be or include a decryption key.

The information stored on secure element 301 may include one or more software applications (computer-executable instructions) and/or data utilized by those software applications. Examples of software applications and data include payment transaction software (along with associated bank account information), identification data (e.g., driver's license information, passport information, medical information), coupon presentation/generation software, and service provider loyalty software and data. Secure element 301 may be provisioned with some or all of this information via the service provider's TSM services or by the service provider's third party vendor TSM. As discussed above, some of the information may be pre-provisioned when the client mobile device is purchased from an MNO or its vendor, and other of the information may later be provisioned over the air or by integration of a new secure element into the client mobile device.

The service provider may have a contractual agreement with one or more MNOs, vendors of the MNOs, or client mobile device manufacturers, to have secure element 301 pre-provisioned with software and/or data specific to the service provider. For example, if the service provider is a bank, then the software may include a mobile payment software application that allows the user of the client mobile device to make payments from an account of the bank, along with data such as account information specific to the user. The agreement may further call for secure element 301 (or at least some of the information stored thereon) to be secured by a domain key specific to (and known by) the particular service provider.

Such pre-provisioning may be convenient for a user who is already a customer of the service provider. For those users that are not already a customer of the service provider, such pre-provisioning may motivate the user to become a customer in order to enjoy the convenience of the software already available on the client mobile device.

Because the service provider may be the sole party (other than the MNO) having knowledge of the domain key, the service provider may now be in a position to allow and/or disallow other entities' software and data to be added to secure element 301. This gatekeeper status may allow the service provider to charge a fee to each entity that wishes to have their software and/or data placed on secure element 301. Rather than compete with their own secure elements, other entities may wish to pay the service provider a fee so that the client mobile device users will also be exposed to those entities' services. For example, assume that the service provider's software and/or data on secure element 301 includes a mobile payment platform. While the user of the client mobile device may utilize that service provider's mobile payment platform, the user may additionally or alternatively desire to use a different mobile payment platform. Rather than force the user to replace the secure element 301 and/or manually provision a new payment system on the client mobile device, the user may be allowed to download the other entity's mobile payment platform and have that competing platform automatically provisioned with the information already stored on secure element 301. At this point, the user may now have the flexibility to use either mobile payment platform. Such flexibility could be a selling point for the client mobile device, because few users desire to be in a position where they are forced to use only a single service provider's services. Moreover, because of this convenience and flexibility that would be demanded by the user, the other entity would likely be motivated to pay a fee to the service provider so as to be a part of such a flexible system.

II. Illustrative Embodiments

Figure 4A:
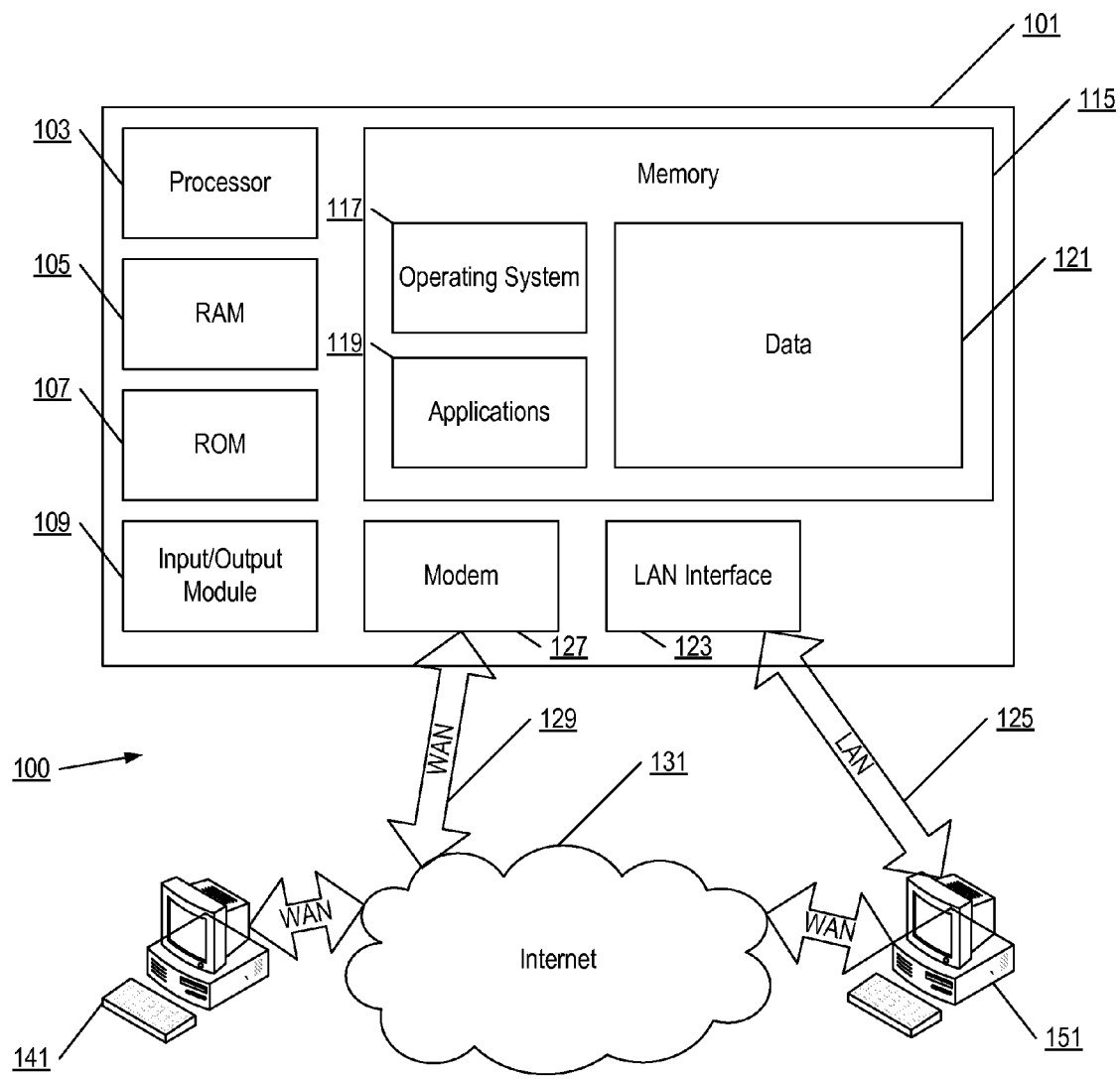
FIG. 4A illustrates an example operating environment in which various aspects of the disclosure may be implemented.

FIG. 4A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4B:
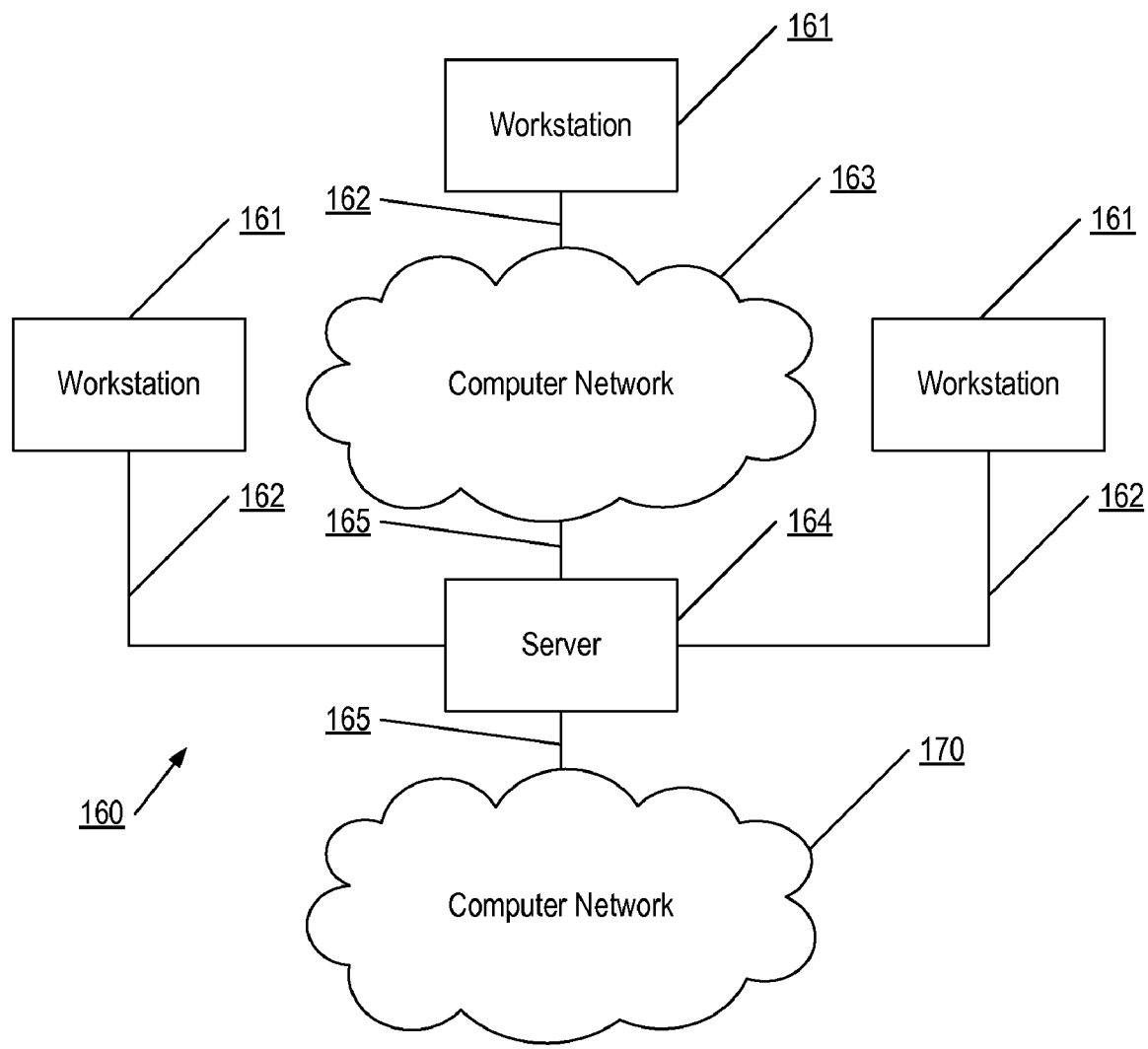
FIG. 4B illustrates another example operating environment in which various aspects of the disclosure may be implemented.

FIG. 4B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 5:
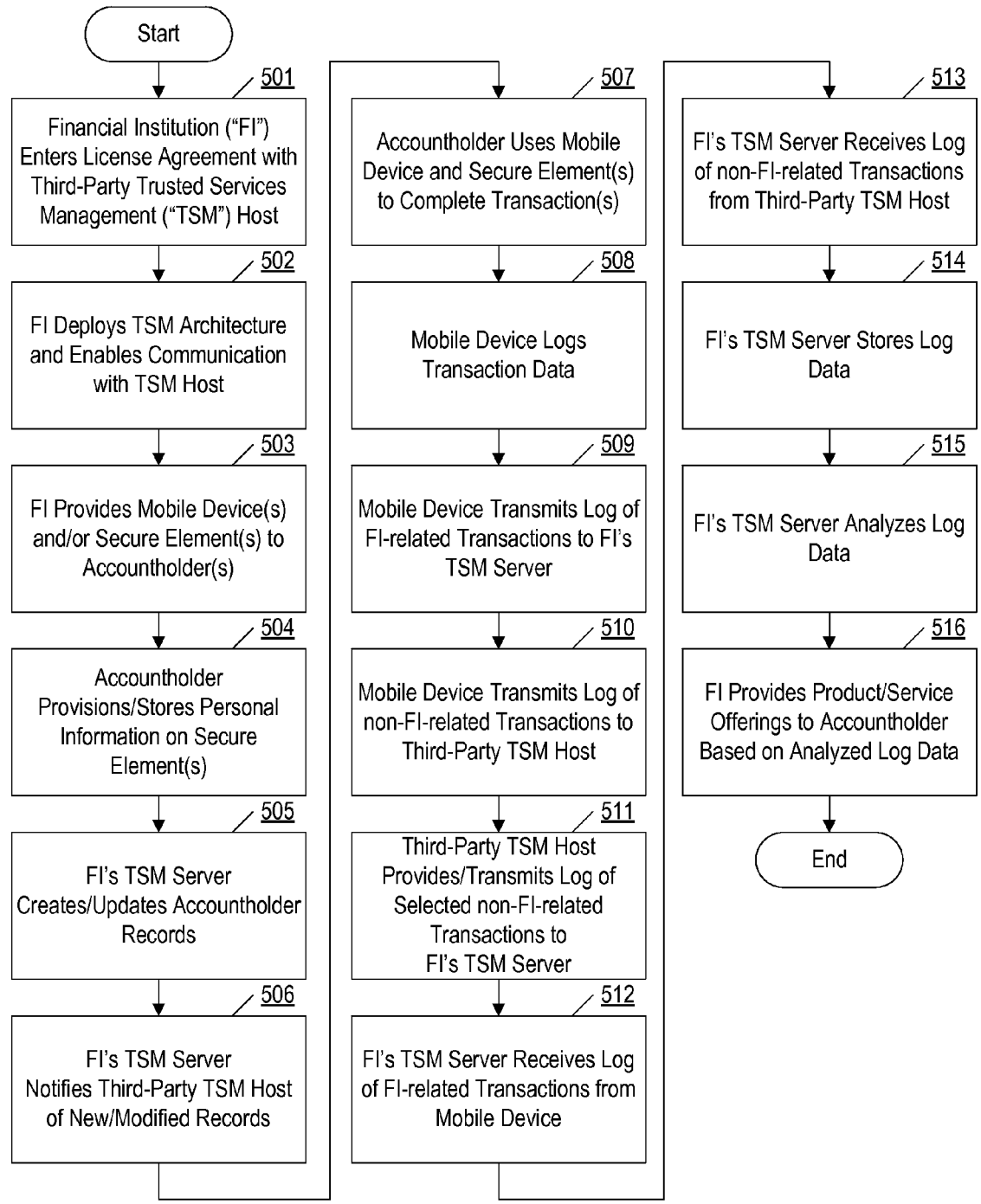
FIG. 5 illustrates a method of providing trusted services management using a hybrid service model according to one or more illustrative aspects described herein.

FIG. 5 illustrates a method of providing trusted services management using a hybrid service model according to one or more illustrative aspects described herein. According to one or more aspects, the methods described herein may be implemented by software executed on one or more computers, such as the generic computing device 101 of FIG. 4A, and/or by a computing system, such as system 160 of FIG. 4B. In at least one arrangement, the methods described herein may be performed by and/or in combination with a server (e.g., server 164). Additionally or alternatively, the methods described herein may be performed by and/or in combination with one or more workstations (e.g., workstations 161).

In step 501, an organization, such as a financial institution, may enter into a license agreement with a third-party trusted services management ("TSM") host. For example, a first financial institution may negotiate and enter into a contract with a TSM host under which the first financial institution may provide some TSM services (e.g., management of personal information, such as accountholder names, account numbers, and so on, as well as provisioning of such information to one or more secure elements) to accountholders of the financial institution, while the TSM host may provide some redundant TSM services to the same accountholders and/or different TSM services not provided by the first financial institution (e.g., the TSM host may agree to provide accountholders of the financial institution with customer support when such accountholders request assistance with provisioning one or more secure elements).

In one or more arrangements, the TSM host further may provide similar TSM services to one or more other organizations, such as other financial institutions. For instance, the TSM host may provide TSM services to a second financial institution that may have accountholders who are also accountholders of the first financial institution (e.g., the financial institution entering into the license agreement with the TSM host), and these shared accountholders may provision one or more mobile devices and/or one or more corresponding secure elements with account information corresponding to their accounts with each of the two (or more) financial institutions. In these arrangements, the first financial institution's contractual relationship with the TSM host may afford the financial institution unique opportunities, visibility, and insight into customer spending habits and/or other usage trends, as the financial institution may not only be able to obtain information related to an individual customer's usage of an account serviced by the financial institution and/or a secure element managed by the financial institution, but also may be able to obtain information related to the individual customer's usage of accounts serviced by another financial institution and/or a secure element managed by the third-party TSM host and/or the other financial institution. In particular, in these arrangements, the financial institution (e.g., the financial institution entering into the license agreement with the TSM host) may be able to obtain such information under the license agreement entered into with the TSM host, as under this agreement, the financial institution may be entitled to access, receive, and/or otherwise obtain transaction logs and/or other usage data describing transactions, usage events, and so on, that occurred and/or were performed with respect to any and/or all of the one or more secure elements and/or provisioned devices of accountholders of the financial institution.

For example, if an accountholder of a first financial institution were to provision a first secure element of a mobile device with first account information corresponding to their account with the first financial institution (e.g., by securely storing, on a MicroSD card or other secure element in their smart phone, their account number and/or other account-related information, such as a credit card number corresponding to a credit card issued to the accountholder by the first financial institution), and if the accountholder were to further provision either the first secure element or a second secure element included in the same mobile device with second account information corresponding to their account with a second financial institution (e.g., by securely storing, on the same MicroSD card or on another secure element in their smart phone, a credit card number corresponding to a credit card issued to the accountholder by the second financial institution), the first financial institution may, under a license agreement with the third-party TSM host (which may provide TSM services to both the first financial institution and the second financial institution), be able to obtain transaction logs and/or other usage information about transactions conducted by the accountholder using the second account information provisioned to one of the secure elements on the mobile device. In some instances, the financial institution might be limited under the license agreement with the TSM host to accessing, receiving, and/or otherwise obtaining transaction logs and/or other usage data occurring with respect to a secure element or a mobile device on which the financial institution (or the accountholder using the secure element or mobile device) has also provisioned information, while in other instances, the financial institution may, under the license agreement with the third-party TSM host, be able to access, receive, and/or otherwise obtain transaction logs and/or other usage data occurring with respect to any secure element or mobile device on which an accountholder of the financial institution has provisioned and/or stored information (even if such information is not related to the accountholder's one or more accounts with the financial institution).

In step 502, the financial institution may deploy TSM architecture and enable communications with the third-party TSM host. For example, having negotiated and entered into a license agreement with the TSM host, the financial institution may obtain, configure, and connect one or more computing devices and/or servers to be used in managing and providing TSM services to accountholders. In one or more arrangements, the deployment of the TSM architecture by the financial institution may produce an environment resembling the example environment illustrated in FIG. 1, which is described above. In some arrangements, one or more servers making up the TSM architecture deployed by the financial institution may be virtual servers provided by cloud computing hardware and/or software. By deploying the TSM architecture using cloud computing, the financial institution may increase the scalability and improve the cost-effectiveness of its self-managed TSM services (e.g., the TSM services provided by the financial institution itself, rather than the TSM services provided to the financial institution and/or accountholders thereof by the third-party TSM host under the license agreement).

Subsequently, in step 503, the financial institution may provide one or more mobile devices and/or one or more secure elements to one or more accountholders so as to enable, for instance, the one or more accountholders to conduct transactions using the mobile devices and/or secure elements. In some instances, it might not be necessary for the financial institution to provide some or all of the accountholders with mobile devices and/or secure elements as one or more accountholders may already possess such elements and/or devices. For example, an accountholder of the financial institution may already have a smartphone that includes a secure element, like a MicroSD card, and it thus might not be necessary to provide the accountholder with a mobile device or a secure element, as the accountholder's existing hardware may be compatible with the TSM architecture deployed by the financial institution.

In step 504, an accountholder of the financial institution may provision and/or otherwise store personal information on one or more secure elements included in his or her mobile device. For example, the accountholder may securely store (e.g., in an encrypted data structure), on a MicroSD card included in his or her smartphone, his or her credit card number (corresponding to a credit card issued by the financial institution), his or her debit card number, his or her driver's license number, his or her passport information, and so on. Other types of personal information (e.g., prepaid gift card numbers, hotel room key information, and the like) may similarly be provisioned and/or stored on the secure element. In one or more arrangements, the accountholder may provision and/or otherwise store such information on the secure element via an application and/or software user interface displayed on and/or provided via the mobile device. Additionally or alternatively, the accountholder may provision and/or otherwise store this information on the secure element via a web portal user interface provided over the Internet by the financial institution. Such a web portal user interface may resemble the example user interface illustrated in FIG. 7, as further described below.

In step 505, the financial institution's TSM server (e.g., a server included in the TSM architecture deployed by the financial institution) may create and/or update accountholder records based on the information provisioned and/or stored on the secure element in step 504. For example, if the accountholder provisioned and/or stored personal information to the secure element via a user interface provided and displayed by the mobile device, then the mobile device may transmit (and the financial institution's TSM server may receive) data about the provisioned and/or stored personal information, and this data may be stored in accountholder records created and/or stored on the financial institution's TSM server and/or in a database accessible by such a server. In some arrangements, only legally approved personal information might be stored and/or made accessible, so as to maintain compliance with any laws and/or regulations that may be applicable to the financial institution's TSM architecture, such as laws and/or regulations dealing with data retention and storage, for instance. Additionally or alternatively, if the accountholder provisioned and/or stored personal information on the secure element via a web portal user interface provided by the financial institution, then in transmitting and saving such information to the secure element on the mobile device, the financial institution's TSM server also may store data about the provisioned personal information in similar accountholder records.

Subsequently, in step 506, the financial institution's TSM server may notify the third-party TSM host that one or more accountholder records have been created and/or updated. For example, the financial institution TSM server may notify the TSM host of new or modified records by sending an electronic message to the TSM host. Such a message may enable the TSM host to update its own records about which information logs (e.g., transaction logs and/or other usage data corresponding to particular users, secure elements, and/or mobile devices) the financial institution is permitted to access and/or otherwise obtain.

Thereafter, in step 507, the accountholder may use the mobile device and one or more secure elements included therein to complete one or more transactions. For example, if the accountholder has provisioned a secure element on the mobile device with a credit card number corresponding to a credit card issued to the accountholder by the first financial institution, the accountholder may use the secure element and the mobile device at a point of sale to purchase goods and/or services and complete a corresponding credit card transaction. In another example, if the accountholder has provisioned a secure element on the mobile device with a hotel room key, for instance, the accountholder may use the secure element and the mobile device at a hotel door to lock and/or unlock the door.

In step 508, the mobile device may log data about the one or more transactions completed by the accountholder. For example, as the accountholder uses the mobile device and one or more secure elements to complete one or more transactions (e.g., in step 507), the mobile device may store information about each of the one or more transactions in a data table to facilitate such logging. The information that may be logged by the mobile device at this point may include an identifier identifying the secure element that was used to complete the transaction, the date and time of the transaction, the amount of the transaction (if any), the other party or parties to the transaction (if any), and so on. Examples of the type of information that may be logged by the mobile device may also be seen in the example transaction logs illustrated in FIG. 9, which is further described below.

In step 509, the mobile device may transmit a log of transactions related to the financial institution to the financial institution's TSM server. In one or more arrangements, the transactions related to the financial institution may be transactions completed using a mobile device and/or secure element provided by the financial institution, while in other arrangements, the transactions related to the financial institution may be transactions in which the accountholder's account with the financial institution was implicated (e.g., credited, debited, and the like). In both cases, these transactions may, for instance, be distinct from other transactions considered to be "not related" to the financial institution, such as transactions completed using a secure element not provided by the financial institution that do not implicate the accountholder's account with the financial institution.

In step 510, the mobile device may transmit a log of transactions not related to the financial institution to the third-party TSM host. As noted above, the transactions not related to the financial institution may be transactions completed using a secure element on the mobile device that was not provided by the financial institution and that does not implicate the accountholder's account with the financial institution. For example, if a user of the mobile device used a second secure element on the mobile device that was provided and/or provisioned by a second financial institution to complete one or more transactions, the mobile device may transmit a log including details about these one or more transactions to the third-party TSM host.

In step 511, in response to receiving the log of transactions not related to the financial institution, the third-party TSM host may transmit this log of transactions to the financial institution (e.g., to the financial institution's TSM server). According to one or more aspects, transmitting this log of transactions to the financial institution may be based on determining that the financial institution has the right to access and/or otherwise obtain such information under the license agreement between the financial institution and the third-party TSM host. In some arrangements, the TSM host may transmit select portions of the log of transactions to the financial institution consistent with the scope of the license agreement. For instance, the financial institution might have access to the dates, times, and amounts of such transactions, but not the locations where such transactions were carried out.

In step 512, the financial institution's TSM server may receive, from the mobile device, the log of transactions related to the financial institution. For example, in step 512, the financial institution's TSM server may receive the log of transactions transmitted by the mobile device in step 509.

Subsequently, in step 513, the financial institution's TSM server may receive, from the third-party TSM host, the log of transactions not related to the financial institution. As noted above, this log may include details about such transactions and may be provided to the financial institution under the license agreement between the financial institution and the TSM host.

In step 514, the financial institution's TSM server may store the log data received in steps 512 and 513 so as to facilitate further processing and analysis. For example, the TSM server may store such log data in a database stored on the TSM server and/or accessible to the TSM server via the TSM architecture.

In step 515, the financial institution's TSM server may analyze the log data stored in step 514. For example, in step 515, the financial institution's TSM server may execute one or more algorithms so as to determine, based on the log data, whether any incentive offers should be provided to the accountholder and, if so, which one or more incentive offers should be provided. In one or more arrangements, this determination may include evaluating, by the financial institution's TSM server, the log data to determine if the accountholder is using a credit card provided by another financial institution more than a credit card provided by the first financial institution. Additionally or alternatively, this determination may be based on a comparison of the log data (e.g., to see how the accountholder is using their credit card issued by the other financial institution) with offers and/or rewards programs currently available via the financial institution to encourage the accountholder to use the financial institution's own credit card at particular locations instead of the other financial institution's credit card. In one or more additional arrangements, analyzing the log data may include determining, based on the log of transactions not related to the financial institution, a geographic location of the accountholder and providing one or more incentive offers targeted to products and/or services sold in that geographic location. This may be particularly useful where, for instance, the accountholder has booked a trip using the other financial institution's credit card, as the first financial institution (e.g., the financial institution providing the TSM services) might not otherwise be able to determine that the accountholder is traveling and/or to where the accountholder is traveling.

Figure 8:
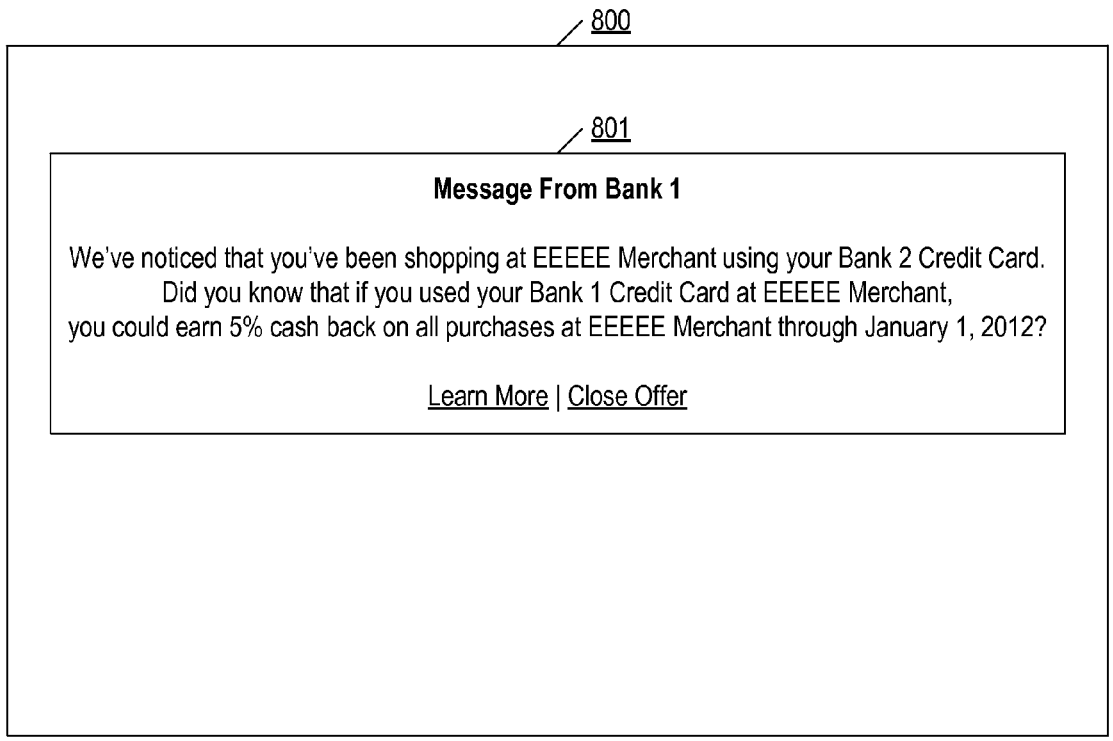
FIG. 8 illustrates an example user interface via which an incentive offer may be provided according to one or more illustrative aspects described herein.

Subsequently, in step 516, the financial institution may provide one or more incentive offers to the accountholder based on the analysis of the log data performed. For example, in step 516, the financial institution may provide the accountholder with one or more incentive offers identified in the analysis of step 515. In one or more arrangements, incentive offers may be provided to the accountholder by the financial institution's TSM server and/or by one or more other computing devices via a web portal user interface. Additionally or alternatively, incentive offers may be provided to the accountholder by sending an electronic mail message, text message, push notification, and/or the like to the accountholder's mobile device. An example of a push notification that includes an incentive offer is illustrated in FIG. 8, which is further described below.

Thereafter, the method may end. Additionally or alternatively, the process may return to step 507, and steps 507 to 516 may be continually repeated in a loop, with the accountholder continuing to use the mobile device and/or one or more secure elements to complete transactions, logging data being collected and shared with the financial institution's TSM servers and subsequently analyzed, and incentive offers being provided to the accountholder when appropriate. In at least one arrangement, for instance, the mobile device may transmit updated information logs to the financial institution's TSM server and/or the third-party TSM host according to a predetermined schedule (e.g., hourly, daily, weekly, biweekly, and the like).

Having described an example method of providing trusted services management using a hybrid service model, an example system configuration and several user interfaces that may be used in implementing such features will now be described.

Figures 6, 7:
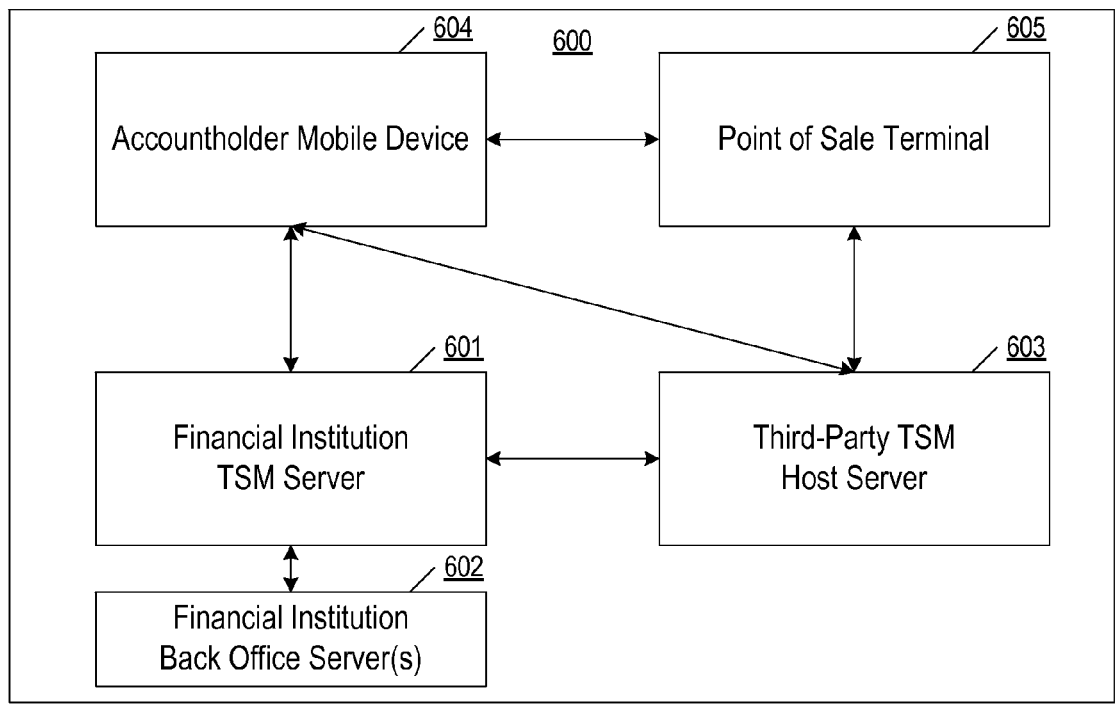
FIG. 6 illustrates an example system configuration for providing trusted services management using a hybrid service model according to one or more illustrative aspects described herein.
FIG. 7 illustrates an example user interface via which one or more secure elements may be managed according to one or more illustrative aspects described herein.

FIG. 6 illustrates an example system configuration for providing trusted services management using a hybrid service model according to one or more illustrative aspects described herein. As seen in FIG. 6, example system 600 may include a self-managed TSM server 601 that may provide TSM services to one or more accountholders of a financial institution and may be managed by the financial institution. In addition, example system 600 may include one or more back office servers 602 operated by the financial institution. Back office servers 602 may, for instance, store various accountholder records, such as transaction history information for one or more accounts.

According to one or more aspects, example system 600 further may include a third-party TSM host server 603. As also described above, the third-party TSM host server 603 may provide TSM services to accountholders of the financial institution, as well as accountholders of one or more other financial institutions. Example system 600 also may include one or more mobile devices, such as accountholder mobile device 604. In one or more arrangements, accountholder mobile device 604 may be a smartphone owned and/or operated by an accountholder of the financial institution. In addition, accountholder mobile device 604 may include one or more secure elements, such as one or more MicroSD cards, secure SIM cards, NFC stickers, and so on. Additionally, example system 600 may include one or more point of sale terminals, such as point of sale terminal 605, with which one or more mobile devices, such as accountholder mobile device 604, may communicate electronically so as to complete one or more transactions using secure personal information provisioned to the secure elements of the mobile devices.

FIG. 7 illustrates an example user interface via which one or more secure elements may be managed according to one or more illustrative aspects described herein. As seen in FIG. 7, user interface 700 may be a web portal user interface via which an accountholder of a financial institution can manage one or more secure elements on a registered mobile device.

In one or more arrangements, user interface 700 may include a registered device menu 701, which may allow a user to add a device to be provisioned with secure personal information and/or to select a different device for such provisioning. User interface 700 further may include a listing of currently stored information 702 in which information about the personal data currently stored on the selected device may be displayed.

For example, user interface 700 may include a first listing 703 that includes personal data currently stored on a first secure element of the selected mobile device and a second listing 704 that includes personal data currently stored on a second secure element of the selected mobile device. Additionally or alternatively, user interface 700 may include controls, such as controls 703a, 703b, 703c, 703d, and 704a, which may allow the user to modify and/or remove personal data from the secure elements of the mobile device. User interface 700 also may include controls 705 and 706, which may allow a user to add additional personal data to one or more of the secure elements of the mobile device and save changes to the mobile device secure element configuration, respectively.

FIG. 8 illustrates an example user interface via which an incentive offer may be provided according to one or more illustrative aspects described herein. As seen in FIG. 8, user interface 800 may include a notification window 801 in which an incentive offer is displayed. In some arrangements, user interface 800 and/or notification window 801 may be displayed to a user via a web portal user interface, while in other arrangements, user interface 800 and/or notification window 801 may be displayed to a user on the mobile device itself (e.g., as a push notification).

Figure 9:
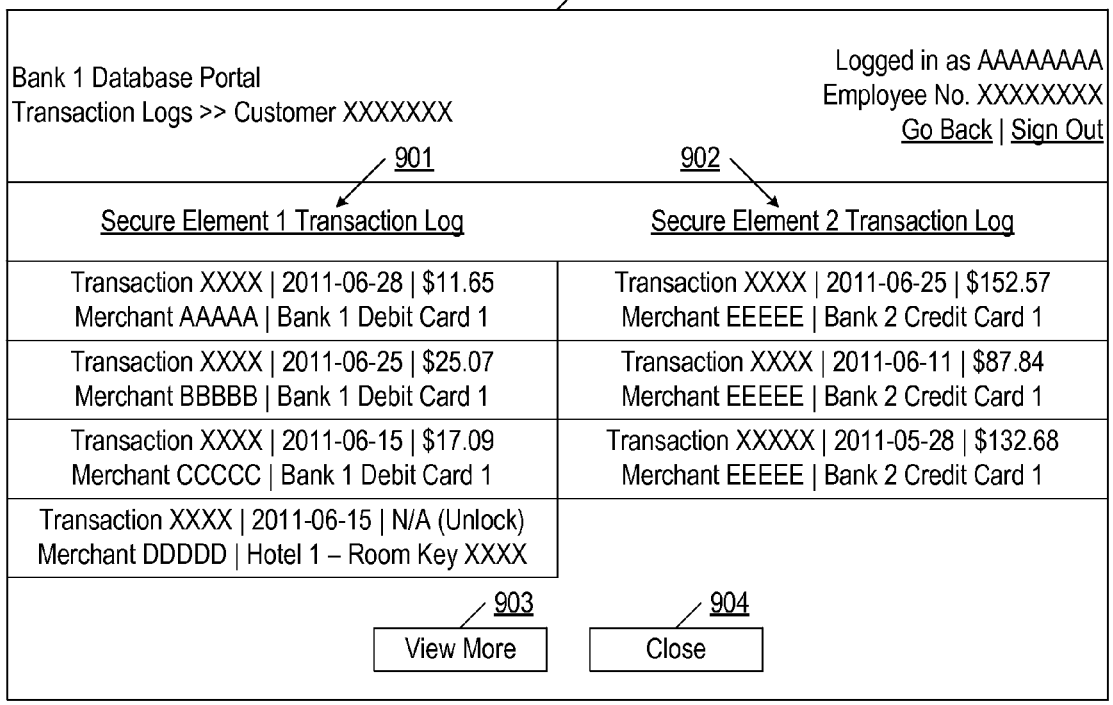
FIG. 9 illustrates an example user interface via which one or more transaction logs may be displayed and/or analyzed according to one or more illustrative aspects described herein.

FIG. 9 illustrates an example user interface via which one or more transaction logs may be displayed and/or analyzed according to one or more illustrative aspects described herein. According to one or more aspects, user interface 900 may be displayed to an employee or other associate of the financial institution, and user interface 900 may include one or more reports in which data collected from one or more transaction logs associated with one or more secure elements used by an accountholder may be presented. For example, user interface 900 may include a first listing 901 including transaction log information corresponding to a first secure element in the mobile device of an accountholder. User interface 900 further may include a second listing 902 including transaction log information corresponding to a second secure element in the mobile device of the accountholder. In addition, user interface 900 may include one or more controls, such as buttons 903 and 904, which may allow a user to view additional transaction log information and close the displayed user interface, respectively.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
receiving, via a communication interface of a computing device, a first transaction log of a first secure element included in a first mobile computing device, the first secure element being provisioned with first secure information provided to a user of the first mobile computing device by a first entity, wherein said computing device further comprises a processor and a memory;
receiving, via the communication interface, a second transaction log of a second secure element included in the first mobile computing device, the second secure element being provisioned with second secure information provided to the user of the first mobile computing device by a second entity different from the first entity, wherein the second transaction log is received via a third entity different from the first entity and the second entity, the third entity providing the second transaction log to the first entity under a license agreement between the first entity and the third entity; and
providing, based on the first transaction log and the second transaction log, an incentive offer to the user of the first mobile computing device.

2. The method of claim 1, wherein the first entity is a first financial institution, the second entity is a second financial institution, and the third entity is a trusted services management (TSM) hosting provider.

3. The method of claim 1, wherein the first entity provides a web interface via which a user of the first mobile computing device can provision the first secure element and the second secure element.

4. The method of claim 1,
wherein the first secure element is provisioned with first credit card information, the first credit card information corresponding to a first credit card issued to a user of the first mobile computing device by the first entity, and
wherein the second secure element is provisioned with second credit card information, the second credit card information corresponding to a second credit card issued to the user of the first mobile computing device by the second entity.

5. A method, comprising:
receiving, via a communication interface of a computing device, a first transaction log of a first secure element included in a first mobile computing device, the first secure element being provisioned with first secure information provided to a user of the first mobile computing device by a first entity, wherein the first secure element is provisioned with first credit card information, the first credit card information corresponding to a first credit card issued to a user of the first mobile computing device by the first entity, and wherein said computing device further comprises a processor and a memory;
receiving, via the communication interface, a second transaction log of a second secure element included in the first mobile computing device, the second secure element being provisioned with second secure information provided to the user of the first mobile computing device by a second entity different from the first entity, wherein the second secure element is provisioned with second credit card information, the second credit card information corresponding to a second credit card issued to the user of the first mobile computing device by the second entity; and in response to determining by the processor, based on the first transaction log and the second transaction log, that the user is using the second credit card more than the first credit card, providing the user an incentive offer to use the first credit card more than the second credit card.

6. The method of claim 1,
wherein the first secure element is a secure SIM card, a MicroSD card, or a near-field communications (NFC) sticker, and
wherein the first mobile computing device is provided to a user thereof with the first secure element pre-provisioned with the first secure information.

7. An apparatus, comprising:
at least one processor; and
memory storing computer-readable instructions that, when executed by the at least one processor, cause the apparatus to:
receive a first transaction log of a first secure element included in a first mobile computing device, the first secure element being provisioned with first secure information provided to a user of the first mobile computing device by a first entity;
receive a second transaction log of a second secure element included in the first mobile computing device, the second secure element being provisioned with second secure information provided to the user of the first mobile computing device by a second entity different from the first entity, wherein the second transaction log is received via a third entity different from the first entity and the second entity, the third entity providing the second transaction log to the first entity under a license agreement between the first entity and the third entity; and
provide, based on the first transaction log and the second transaction log, an incentive offer to the user of the first mobile computing device.

8. The apparatus of claim 7, wherein the first entity is a first financial institution, the second entity is a second financial institution, and the third entity is a trusted services management (TSM) hosting provider.

9. An apparatus, comprising:
at least one processor; and
memory storing computer-readable instructions that, when executed by the at least one processor, cause the apparatus to:
receive a first transaction log of a first secure element included in a first mobile computing device, the first secure element being provisioned with first secure information provided to a user of the first mobile computing device by a first entity;
receive a second transaction log of a second secure element included in the first mobile computing device, the second secure element being provisioned with second secure information provided to the user of the first mobile computing device by a second entity different from the first entity, wherein the first entity provides a web interface via which a user of the first mobile computing device can provision the first secure element and the second secure element; and
provide, based on the first transaction log and the second transaction log, an incentive offer to the user of the first mobile computing device.

10. The apparatus of claim 7,
wherein the first secure element is provisioned with first credit card information, the first credit card information corresponding to a first credit card issued to a user of the first mobile computing device by the first entity, and
wherein the second secure element is provisioned with second credit card information, the second credit card information corresponding to a second credit card issued to the user of the first mobile computing device by the second entity.

11. An apparatus, comprising:
at least one processor; and
memory storing computer-readable instructions that, when executed by the at least one processor, cause the apparatus to:
receive a first transaction log of a first secure element included in a first mobile computing device, the first secure element being provisioned with first secure information provided to a user of the first mobile computing device by a first entity, wherein the first secure element is provisioned with first credit card information, the first credit card information corresponding to a first credit card issued to a user of the first mobile computing device by the first entity;
receive a second transaction log of a second secure element included in the first mobile computing device, the second secure element being provisioned with second secure information provided to the user of the first mobile computing device by a second entity different from the first entity, wherein the second secure element is provisioned with second credit card information, the second credit card information corresponding to a second credit card issued to the user of the first mobile computing device by the second entity; and
in response to determining, based on the first transaction log and the second transaction log, that the user is using the second credit card more than the first credit card, provide the user an incentive offer to use the first credit card more than the second credit card.

12. An apparatus, comprising:
at least one processor; and
memory storing computer-readable instructions that, when executed by the at least one processor, cause the apparatus to:
receive a first transaction log of a first secure element included in a first mobile computing device, the first secure element being provisioned with first secure information provided to a user of the first mobile computing device by a first entity;
receive a second transaction log of a second secure element included in the first mobile computing device, the second secure element being provisioned with second secure information provided to the user of the first mobile computing device by a second entity different from the first entity; and
provide, based on the first transaction log and the second transaction log, an incentive offer to the user of the first mobile computing device,
wherein the apparatus is a first trusted services management (TSM) hosting server operated by the first entity, the first entity being a first financial institution, wherein the apparatus is configured to communicate electronically with a second TSM hosting server operated by a third entity, wherein the first TSM hosting server provides first services to a user of the first mobile computing device, and wherein the second TSM hosting server provides second services, different from the first services, to the user of the first mobile computing device.

13. At least one non-transitory computer-readable medium having computer-executable instructions stored thereon that, when executed, cause at least one computing device to:

receive a first transaction log of a first secure element included in a first mobile computing device, the first secure element being provisioned with first secure information provided to a user of the first mobile computing device by a first entity;

receive a second transaction log of a second secure element included in the first mobile computing device, the second secure element being provisioned with second secure information provided to the user of the first mobile computing device by a second entity different from the first entity, wherein the second transaction log is received via a third entity different from the first entity and the second entity, the third entity providing the second transaction log to the first entity under a license agreement between the first entity and the third entity; and provide, based on the first transaction log and the second transaction log, an incentive offer to the user of the first mobile computing device.

14. The at least one non-transitory computer-readable medium of claim 13, wherein the first entity is a first financial institution, the second entity is a second financial institution, and the third entity is a trusted services management (TSM) hosting provider.

15. At least one non-transitory computer-readable medium having computer-executable instructions stored thereon that, when executed, cause at least one computing device to:

receive a first transaction log of a first secure element included in a first mobile computing device, the first secure element being provisioned with first secure information provided to a user of the first mobile computing device by a first entity;

receive a second transaction log of a second secure element included in the first mobile computing device, the second secure element being provisioned with second secure information provided to the user of the first mobile computing device by a second entity different from the first entity, wherein the first entity provides a web interface via which a user of the first mobile computing device can provision the first secure element and the second secure element; and provide, based on the first transaction log and the second transaction log, an incentive offer to the user of the first mobile computing device.

16. The at least one non-transitory computer-readable medium of claim 13, wherein the first secure element is provisioned with first credit card information, the first credit card information corresponding to a first credit card issued to a user of the first mobile computing device by the first entity, and wherein the second secure element is provisioned with second credit card information, the second credit card information corresponding to a second credit card issued to the user of the first mobile computing device by the second entity.

17. At least one non-transitory computer-readable medium having computer-executable instructions stored thereon that, when executed, cause at least one computing device to:

receive a first transaction log of a first secure element included in a first mobile computing device, the first secure element being provisioned with first secure information provided to a user of the first mobile computing device by a first entity, wherein the first secure element is provisioned with first credit card information, the first credit card information corresponding to a first credit card issued to a user of the first mobile computing device by the first entity;

receive a second transaction log of a second secure element included in the first mobile computing device, the second secure element being provisioned with second secure information provided to the user of the first mobile computing device by a second entity different from the first entity, wherein the second secure element is provisioned with second credit card information, the second credit card information corresponding to a second credit card issued to the user of the first mobile computing device by the second entity, and wherein the first transaction log and the second transaction log are received according to a predetermined schedule; and provide, based on the first transaction log and the second transaction log, an incentive offer to the user of the first mobile computing device.

* * * * *